United States Patent
Lin et al.

(10) Patent No.: US 12,445,795 B2
(45) Date of Patent: Oct. 14, 2025

(54) AUDIO SYSTEM WITH DYNAMIC AUDIO SETTING ADJUSTMENT FEATURE

(71) Applicant: ROKU, INC., San Jose, CA (US)

(72) Inventors: Yu-Cheng Lin, Golden, CO (US); Brian James Hetherman, Medford, MA (US); Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 325 days.

(21) Appl. No.: 18/163,207

(22) Filed: Feb. 1, 2023

(65) Prior Publication Data

US 2024/0259752 A1 Aug. 1, 2024

(51) Int. Cl.
*H04S 7/00* (2006.01)
*H04R 5/02* (2006.01)
*H04R 5/04* (2006.01)

(52) U.S. Cl.
CPC ............ *H04S 7/303* (2013.01); *H04R 5/02* (2013.01); *H04R 5/04* (2013.01); *H04S 7/301* (2013.01); *H04S 2400/11* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 8,932,134 B2 * | 1/2015 | Andall | A63F 13/54 381/303 |
| 9,152,376 B2 * | 10/2015 | Johnston | G10L 15/22 |
| 9,191,767 B2 * | 11/2015 | Hopkins | H04S 7/303 |
| 9,743,212 B2 * | 8/2017 | Ridihalgh | A63F 13/25 |
| 10,771,742 B1 * | 9/2020 | Pance | H04N 21/42203 |
| 11,330,371 B2 * | 5/2022 | Carlsson | H04S 7/307 |
| 2007/0011196 A1 * | 1/2007 | Ball | H04N 21/4223 |
| 2007/0116306 A1 * | 5/2007 | Riedel | H04S 7/303 381/303 |
| 2008/0130923 A1 * | 6/2008 | Freeman | G06F 3/167 381/303 |
| 2014/0003625 A1 * | 1/2014 | Sheen | H04S 7/301 381/103 |
| 2019/0069114 A1 * | 2/2019 | Tai | H04S 3/008 |
| 2024/0251213 A1 * | 7/2024 | McPherson | H04R 27/00 |

* cited by examiner

*Primary Examiner* — Paul W Huber
(74) *Attorney, Agent, or Firm* — McDonnell Boehnen Hulbert & Berghoff LLP

(57) ABSTRACT

In one aspect, an example method for use in connection with an audio system that is configured to present audio within a listening area includes (i) detecting, by a computing system, a position of a user located within the listening area; (ii) using, by the computing system, at least the detected position of the user to identify, from among multiple candidate reference positions, a reference position that most closely matches the detected position of the user; (iii) using, by the computing system, at least the identified reference position as a basis to select a set of audio settings that corresponds to the identified reference position; and (iv) configuring, by the computing system, the audio system based on the selected set of audio settings.

18 Claims, 11 Drawing Sheets

AUDIO SYSTEM WITH DYNAMIC AUDIO SETTING ADJUSTMENT FEATURE

In this disclosure, unless otherwise specified and/or unless the particular context clearly dictates otherwise, the terms "a" or "an" mean at least one, and the term "the" means the at least one.

SUMMARY

In one aspect, an example method is described, the method being for use in connection with an audio system that is configured to present audio within a listening area. The method includes (i) detecting, by a computing system, a position of a user located within the listening area; (ii) using, by the computing system, at least the detected position of the user to identify, from among multiple candidate reference positions, a reference position that most closely matches the detected position of the user; (iii) using, by the computing system, at least the identified reference position as a basis to select a set of audio settings that corresponds to the identified reference position; and (iv) configuring, by the computing system, the audio system based on the selected set of audio settings.

In another aspect, an example computing system is described. The computing system is configured for performing a set of acts for use in connection with an audio system that is configured to present audio within a listening area. The set of acts includes (i) detecting a position of a user located within the listening area; (ii) using at least the detected position of the user to identify, from among multiple candidate reference positions, a reference position that most closely matches the detected position of the user; (iii) using at least the identified reference position as a basis to select a set of audio settings that corresponds to the identified reference position; and (iv) configuring the audio system based on the selected set of audio settings.

In another aspect, a non-transitory computer-readable medium is described. The non-transitory computer-readable medium has stored thereon program instructions that upon execution by a computing system, cause performance of a set of acts for use in connection with an audio system that is configured to present audio within a listening area. The set of acts include (i) detecting a position of a user located within the listening area; (ii) using at least the detected position of the user to identify, from among multiple candidate reference positions, a reference position that most closely matches the detected position of the user; (iii) using at least the identified reference position as a basis to select a set of audio settings that corresponds to the identified reference position; and (iv) configuring the audio system based on the selected set of audio settings.

DETAILED DESCRIPTION

I. Overview

In the context of a home audio system that includes multiple speakers, the system is often configured to optimize audio for a user at one specific location within a given listening area associated with the system. This can be useful in a situation where the user is actually in that one location. However, this might not well account for the user being in a different location or there being more than one user in the listening area. In these scenarios, the audio may not be optimized.

The disclosed systems and methods provide an improved approach to configuring an audio system in connection with these and other types of scenarios. In one aspect, a computing system detects a position of a user within a listening area, and uses that detected position to configure audio settings of the audio system, accordingly.

To provide such functionality, as part of a calibration process, the audio system can determine optimal audio settings (e.g., volume, base, delay) at each of a number of different reference positions within a listening area. These reference positions can be selected by the user based on locations where the user typically listens to audio (e.g., at, on, or near a couch, kitchen, or desk).

At a later time, the audio system can detect a user position within the listening area. The audio system can then compare the user's detected position to multiple candidate reference positions to determine the reference position that is the closest match. The audio system can then configure the audio system based on the audio settings which correspond to the closest matching reference position. The audio system can then repeat this process as the user moves from one position to another, to help ensure that the audio system is continually optimized in view of the for the user's current position.

In another example implementation, the disclosed systems and methods involve detecting a user's position within a given listening area and configuring the audio system based both on the detected user position and determined characteristics of the audio system. In some examples, determining such characteristics can involve establishing the user's position with respect to one or more positions of the speakers within the audio system. The audio system can then adjust an audio setting (e.g., volume, base, delay) for a given speaker or the audio system as a whole, based on the user's position with respect to one or more of the speakers.

Among other things, these techniques can provide more optimized audio for one or more users of an audio system. These and various other features of these systems and methods are described more fully below with reference to the accompanying figures.

II. Example Architecture

A. Audio System

Figure 1:
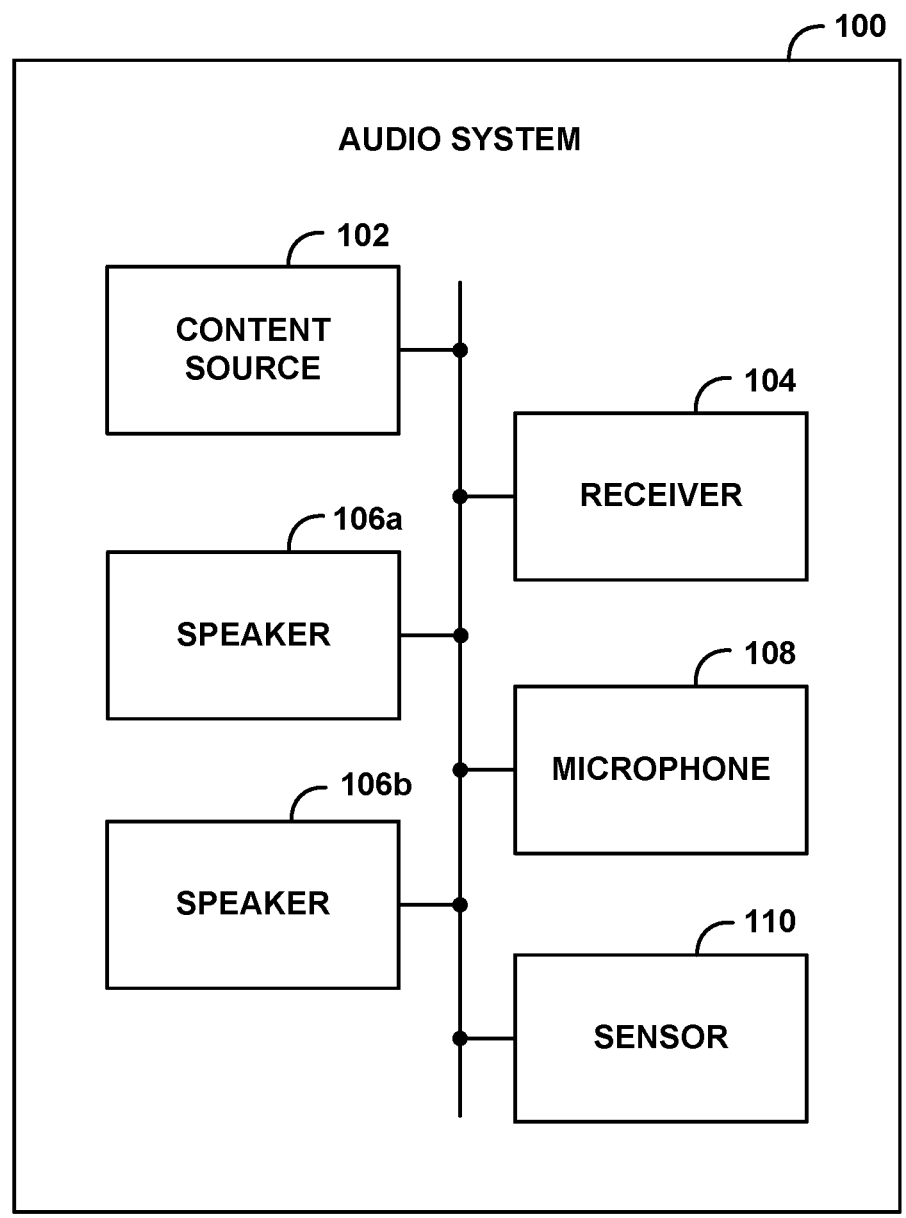
FIG. 1 is a simplified block diagram of an example audio system, in which
various described principles can be implemented.

FIG. 1 is a simplified block diagram of an example audio system 100. The audio system 100 can be configured to perform and/or can perform one or more operations, such as the operations described in this disclosure. The audio system 100 can include various components, such as a content source 102, a receiver 104, speakers 106a-106b, a microphone 108, and a sensor 110.

The content source 102 can be any type of content source, such as a compact disc (CD) player, a digital audio player, a set-top-box, or a streaming media device, among numerous other possibilities. The receiver 104 can be an audio and/or video receiver. The speakers 106a and 106b can be any type of sound speaker (e.g., a soundbar, floor speaker, or portable speaker). The microphone 108 can be any type of microphone configured to capture audio data, and the sensor 110 can include sensors such as RADAR, LIDAR, and/or a time of flight sensor and can be configured to capture data. The sensor 100 can also be a camera configured to capture image data.

The audio system 100 can be associated with a listening area (e.g., a room of a house) and some or all of the components of the audio system 100 can be within or near the listening area. In one example, the speakers 106a and 106b can be configured to output audio in the listening area and the sensor 110 can be a camera configured to capture image data of at least a portion of the listening area.

The audio system 100 can also include one or more connection mechanisms that connect various components within the audio system 100. In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

In some instances, the audio system 100 can include multiple instances of at least some of the described components. The audio system 100 and/or components thereof can take the form of a computing system, an example of which is described below.

B. Computing System

Figure 2:
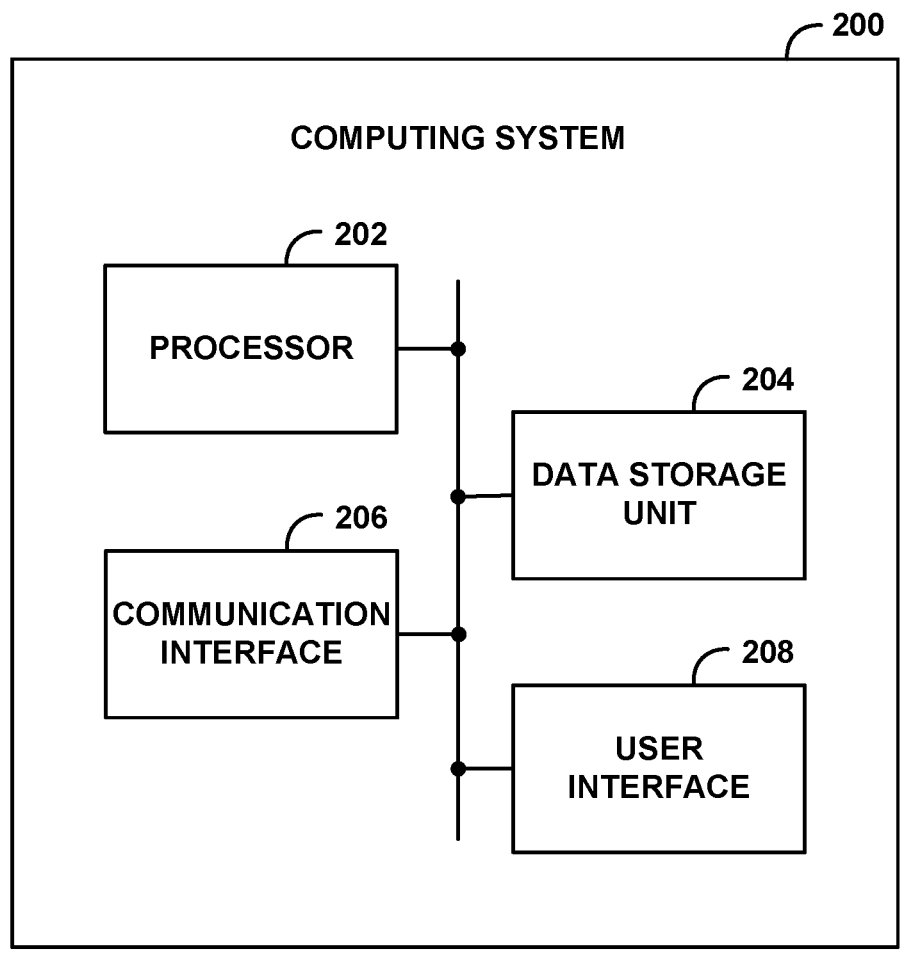
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the audio system 100 and/or components thereof can take the form of a computing system, such as the computing system 200. In some cases, some or all these entities can take the form of a more specific type of computing system, such as a desktop computer, a laptop, a tablet, a mobile phone, a television, or a set-top box or content streaming stick, among other possibilities.

III. Example Operations

The audio system 100 and/or components thereof can be configured to perform and/or can perform one or more operations. Examples of these operations and related features will now be described with reference to various figures.

A. Configuring the Audio System based on User Position

In examples, the audio system 100 can detect a position of a user in the listening area and can configure the audio system with a set of predefined audio settings, based on the detected position of the user.

The audio system 100 can detect a position of a user within the listening area in various ways. For example, the sensor 110 can capture data of the user within the listening area, and/or the microphone 108 can capture audio data of the user within the listening area, and the audio system 100 can then use the captured sensor or audio data to detect the position of the user within the listening area. In some examples, the sensor 110 is a camera and captures image data of the user to detect a position of a user within the listening area. In some examples, sensors such as RADAR, LIDAR, and/or a time of flight sensor can detect a position of a user within the listening area.

The audio system 100 can then use at least the detected position of the user to identify, from among multiple candidate reference positions, a reference position that most closely matches the detected position of the user. To allow for this, the audio system 100 can first perform an initial calibration to detect a position of a user at a number of different reference positions within the listening area. These reference positions can be selected by the user based on locations where the user typically listens to audio (e.g., at, on, or near a couch, kitchen, or desk).

Once the audio system 100 identifies a reference position that most closely matches the detected position of the user, the audio system 100 can use the identified reference position as a basis to select a set of audio settings that corresponds to the identified reference position. To allow for this, during the initial calibration process, the audio system 100 can determine optimal audio settings (e.g., volume, base, delay) at each of the different reference positions within the listening area. The audio system 100 can store mapping data that specifies a corresponding set of audio settings for each candidate reference position. The audio system 100 can then access the stored mapping data to select the set of audio settings that corresponds to the identified reference position.

Once the audio system 100 has selected the set of audio settings that corresponds to the identified reference position, the audio system 100 can then use the selected set of audio settings to configure the audio system 100 based on the selected set of audio settings. For example, the audio system 100 can adjust various settings (e.g., volume, base, delay).

1. Calibrating the Audio System

Figure 3:
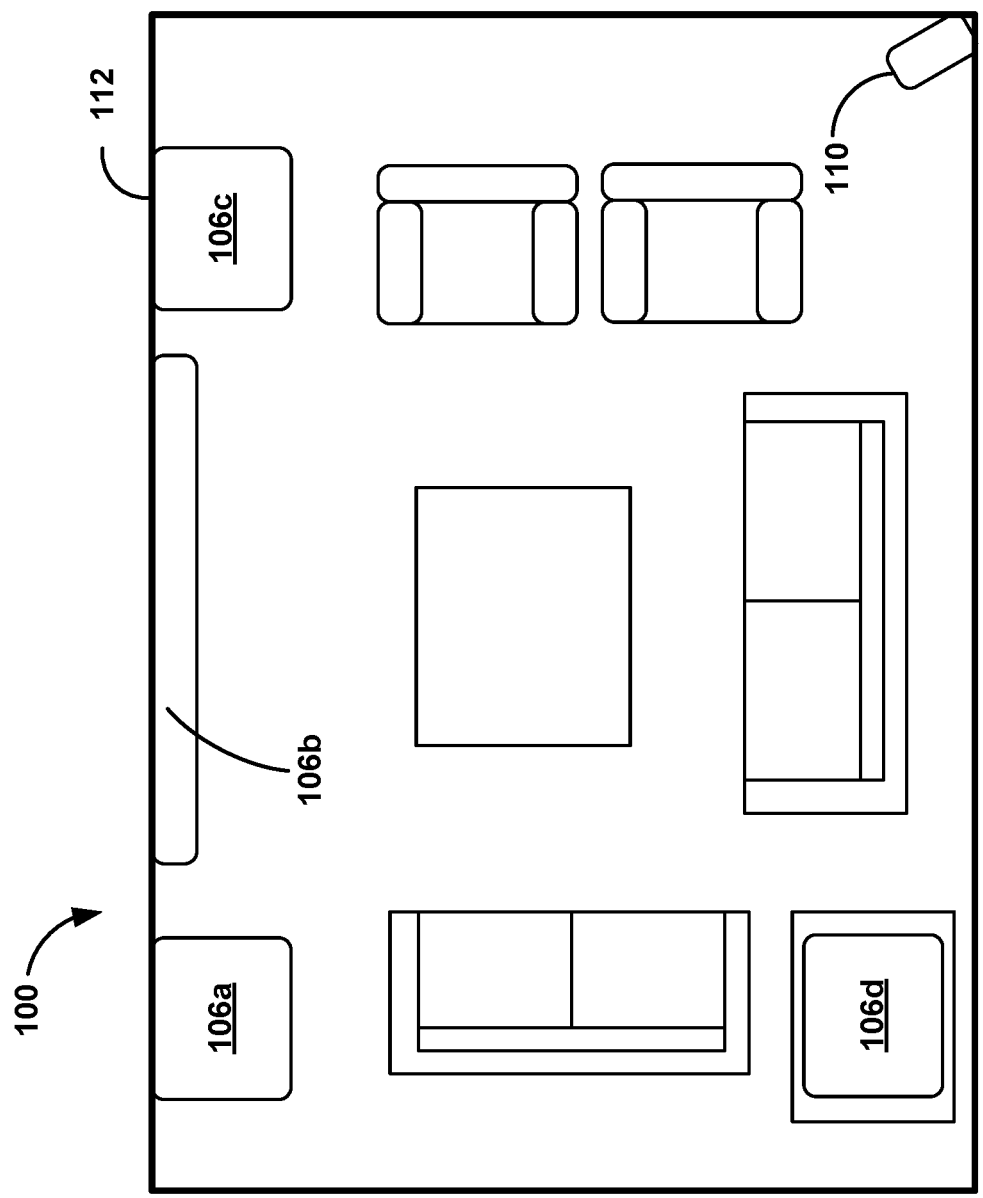
FIG. 3 is a diagram of an example audio system.

As noted above, to allow for configuring the audio system 100 with a set of audio settings based on a detected user position, the audio system 100 can first perform initial calibration operations to determine optimal audio settings (e.g., volume, base, delay) at a number of different reference positions within the listening area. An example audio system 100 is shown in FIG. 3 in connection with a listening area 112. For purposes of illustrations, not every component of the audio system 100 is shown in FIG. 3.

The audio system 100 can perform operations related to calibrating the audio system 100 by: (i) determining characteristics of the audio system within the listening area, (ii) identifying reference positions within the listening area, (iii) for each reference position, using the determined characteristics of the audio system and that reference position to determine corresponding audio settings, and (iv) storing mapping data that maps mapping of the reference positions to corresponding audio settings. The audio system 100 can perform these calibration operations while the audio system 100 is in a calibration mode.

(i) Determining Characteristics of the Audio System

As noted above, to begin calibration operations, and while in the calibration mode, the audio system 100 can determine one more characteristics about the audio system 100, such as the audio system 100 shown in FIG. 3. Characteristics of the audio system 100 can include, for example, the number of speakers 106a-106d, the type of speakers 106a-106d, and/or location of each respective speaker 106a-106d. The initial calibration operations can also include determining at size and/or a room frequency response of a listening area 112.

To determine the number of speakers 106a-106d, the audio system 100 can determine how many speakers are plugged into the receiver 104. In another example, the audio system 100 can determine how many speakers are connected to a WI-FI network.

After the number of speakers 106a-106d is determined, the audio system 100 can also determine the position of the speakers 106a-106d within the listening area 112. The position of each speaker 106a-106d can include location and/or orientation of each respective speaker.

In some examples, to determine the respective position of each of the speakers 106a-106d, the audio system 100 can use beacons signals. For instance, one or more of the speakers 106a-106d can output beacon signals and the microphone 108 can detect the beacon signals to determine the respective delay of the beacon signals received by the microphones 108.

In some examples, the audio system 100 can determine one or more primary speakers (e.g., 106a and 106c) and one or more secondary speakers 106b and 106d. In these examples, the position of each of the primary speakers 106a and 106b can be determined based on their position within the listening area 112, their position relative to an object (e.g., a television or sofa) within the room, etc.

In an example implementation, the audio system 100 can use the sensor 110 to determine the number and/or respective positions of the speakers 106a-106d. For example, the sensor 110 can include a camera and the audio system 100 can analyze image data captured by the camera of at least a portion of the listening area 112 and the speakers 106a-106d. The audio system 100 can use depth estimation techniques of the captured image date to determine respective positions of the speakers 106a-106d. In examples with one camera, the audio system 100 can use monocular depth estimation to determine the respective positions of the speakers 106a-106d. The audio system 100 can also use machine learning algorithms with the captured image data to predict the depth of each pixel in a scene. In examples where the audio system 100 includes more than one camera, the audio system 100 can use triangulation techniques to determine the position of the speakers 106a-106d. The audio system 100 can also use stereoscopic depth estimation with the captured image data, for example, by utilizing epipolar geometry and block matching algorithms.

In another example, the audio system 100 can include sensors such as RADAR, LIDAR, and/or a time of flight sensor to determine the number and/or respective positions of the speakers 106a-106d. In an example, the audio system 100 can use infrared sensors to determine the time to one or more of the speakers 106a-106d.

In another example implementation, the speakers 106a-106d can include strobe lights and the sensor 110 can include a light sensor which can be used to determine the number and/or respective positions of speakers 106a-106d. For example, one or more speakers 106a-106d can emit a strobe light. The light sensors can then detect the emitted light and determine the respective distance to the speakers 106a-106d.

As noted above, in examples, the audio system 100 can determine the size and/or frequency room response of the listening area 112. The audio system 100 can do this by using any audio calibration techniques now known or later discovered. For example, similar to methods described above, the speakers 106a-106d can transmit beacon signals which can be detected by the more microphone 108. The audio system 100 can use audio data captured at the microphones 108 to determine the room frequency response of the listening area 112.

In some example implementations, once the number of speakers 102a-102d and/or position of each speaker within in the listening area 112 is determined, the user can group certain speakers together. The user can do so via the user interface 208, for example. For instance, the user can create a group called "TV Area", the group including speakers 106a-106c.

At any time, the user and/or audio system 100 can initiate a recalibration of the audio system 100. For example, if a new speaker is added in or near the listening area 112, the audio system 100 can recalibrate by performing any combination of the calibration operations described above.

In some implementations, an active listening device can detect when a speaker 106a-106d is not working anymore. For instance, one or more of the speakers 106a-106d can transmit an audio watermark heartbeat periodically, which can be detected by one or more of the remaining speakers 106a-106d. If a speaker's audio watermark heartbeat is no longer detected, the audio system 100 can recalibrate by performing of the calibration operations described above. In these examples, the audio system 100 can also provide an indication to the user by way of a notification to a user device, for example (e.g., e-mail, text message, notification on television).

In other examples, a speaker (e.g., speaker 106d) may be a portable speaker. One or more microphones 108 can use triangulate to determine the new location of the portable speaker if it is moved. Additionally or alternatively, the portable speaker may include a gyroscope to detect movement of the speaker.

(ii) Identifying Reference Positions within the Listening Area

Figure 4:
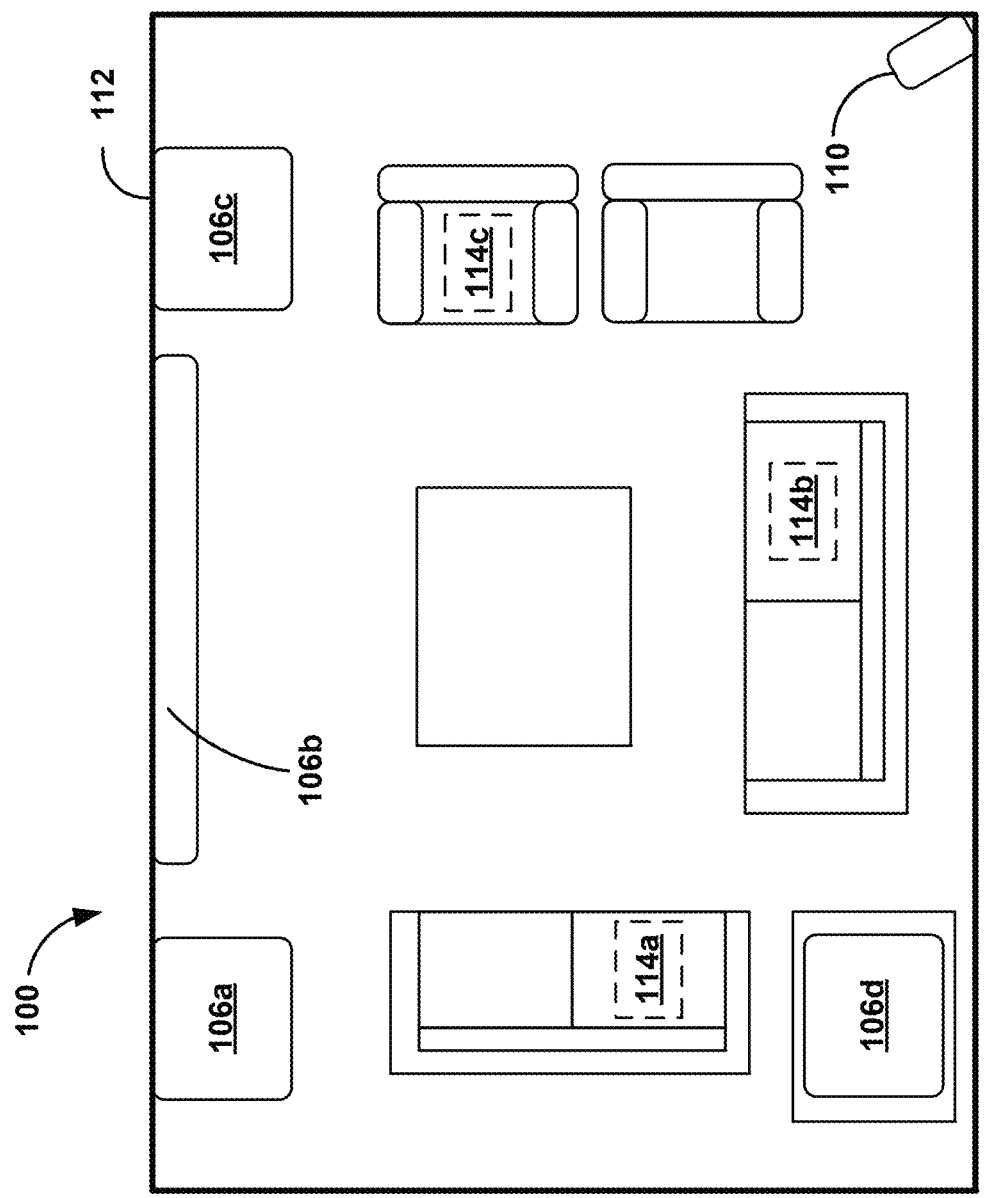
FIG. 4 is a diagram of an example audio system and reference positions.

After one or more characteristics of the audio system 100 are determined, the audio system 100 can identify common positions where one or more users listen to audio, as shown in FIG. 4. For instance the user can choose one or more positions within the listening area 112 where they normally listen to audio. Some common positions are used shown as reference positions 114a-114c.

While the audio system 100 is in the calibration mode, the user can provide an instruction or indication to the audio system 100 that the user is in the desired reference position. For example, the user can sit on the couch at reference position 114a and provide an indication of such to the audio system 100, for example, via a user interface.

Once the audio system 100 has determined that a user is positioned at the desired reference position 114a-114c, the audio system 100, can then identify the position of the user while at the reference position 114a-114c. The determined position of the user can include the location of the user (e.g., X, Y, Z coordinates with respect to one or more speakers 106a-106d, sensors 110) and/or orientation of the user.

In example implementations, the sensor 110 within or near the listening area 112 can capture data of the user and at least a portion of the listening area 112. In examples, where the sensor 110 captures image data, the audio system 100 can use the captured image data to distinguish the user from other components of the image (e.g., background of the room) using techniques such as face detection, for example.

In examples, the audio system 100 can utilize depth estimation techniques, as described in more detail above, to provide an estimation of the user's position. Additionally, in examples, the sensor 110 can capture data to determine additional user information such as gait, size (e.g., height, weight), and/or other information associated with a user. The sensor 110 can include sensors such as cameras, RADAR, LIDAR, and/or a time of flight sensor to provide an estimation of the user's position and/or additional user information, as described above. In examples, the audio system 100 can use the additional user information, such as gait and size, to identify a user and/or a user demographic. For instance, a user's size can be used to determine a user's approximate age demographic.

The audio system 100 can also utilize face detection, or other techniques, to identify an orientation of the user while at the reference position 114a-114c. For instance, the audio system 100 can determine the user's orientation with respect to one or more speaker 106a-106d and/or with respect to an identified object within the listening area 112.

Additionally or alternatively, one or microphones 108 can be used to identify the position of the user while in the reference position 114a-114c. For example, the user can speak an audio command while in the reference position 114a-114c. The audio system 100 can determine the respective delay in receiving the audio command at the one or more microphones 108 to determine the position of the user while in the reference position 114a-114c.

Additionally or alternatively, one or more of the speakers 106a-106d and/or one or more sensors 110 can use infrared sensors to determine the time of flight to the user to determine a location of the user while at the reference position 114a-114c.

(iii) For Each Reference Position, Using Determined Characteristics of the Audio System and the Identified Position to Determine Corresponding Audio Settings Once the position of the user at the reference positions 114a-114c is determined, the audio system 100 can use the determined characteristics of the audio system 100 and the reference positions 114a-114c to determine a set of corresponding audio settings at each of the reference positions 114a-114c. Example audio settings could include a volume setting, a base setting, a surround sound setting, a delay setting, and/or an equalizer setting, among numerous other potential settings. These settings can be determined using any calibration technique now known or later discovered.

For instance, the user can have a microphone on or near their person while at the reference position 114a. For example, the user can hold a user device, such as smartphone, a remote, or other device which includes a microphone. Each speaker 106a-106d in the audio system 100 can output predefined audio signals (e.g., beacons). The user device microphone can capture the audio data of the beacon signals. The user device can transmit the captured audio data to the audio system 100. The audio system 100 can then use the captured audio data to determine the room frequency response and the path of the audio to adjust the delays from each speaker 106a-106d. This allows for an adjustment of the equalization frequency response of the room in a given set of audio settings.

In some examples, the audio system 100 can use the determined location (e.g., X, Y, Z coordinates) of the user at the reference position 114a to determine a distance from the user to one or more of the speakers 106a-106d. The audio system 100 can then determine appropriate delays at each of the speakers 106a-106d at the given reference position 114a. The audio system 100 can also determine appropriate volume settings based on the determined distance from the user to one or more of the speakers 106a-106d. For instance, if the location of the reference position 114a is close in proximity to speaker 106d, the set of audio settings corresponding to reference position 114*a* can include a low volume setting at speaker 106*d*.

In some examples, the set of audio settings can be determined based on how audio content is transmitted, the type of speakers 106*a*-106*d*, and/or the associated equipment such as receiver 104. For example, the audio delay and/or volume settings may vary based on how audio content is transmitted to the speakers 106*a*-106*d* and/or how the speakers 106*a*-106*d* are in communication with each other, such as by Enhanced Audio Return Channel (eARC), WI-FI, and/or Bluetooth.

In some examples, the set of audio settings may include a listening mode, such as surround sound or stereo. For instance, the set of audio settings for reference position 114*b* can include implementing a surround sound mode. This surround sound setting mode can indicate front speakers (e.g., 106*a*-106*c*) and rear speakers (e.g., 106*d*) based on the user's position. The set of audio settings for reference position 114*a* can include implementing a stereo setting using speakers 106*a* and 106*d*.

Additionally or alternatively, audio settings may be determined based on the types of speakers 106*a*-106*d* within the audio system 100. For example, speakers 106*a* and 106*c* may be floor standing speakers. Speaker 106*b* may be a sound bar speaker. And, speaker 102*d* may be a portable speaker. The audio system 100 can the appropriate audio settings at each reference position 114*a*-114*c* based one the types of speakers 106*a*-106*d*.

In some examples, the set of audio settings for the reference position (e.g., 114*a*) can include only selecting a subset, or group, of speakers (e.g., 106*a*-106*c*) within the audio system 100 for outputting audio. The group of speakers can correspond to the group of speakers created by the user, in line with the examples described above. For instance, when a user is in reference position 114*a* on the couch, the set of audio settings may include instructions to output audio from speakers in the "TV Area" group (e.g., speakers 106*a*-106*c*) and to power off speakers 106*d*.

In some examples, one or more users can establish a user profile associated with a user. The user profile can include preferences of the user, such as volume setting, base settings, and surround sound settings. Thus, the set of audio settings can be determined based on the reference position and the user's preference at the given location. For instance, a first set of audio settings can be established for a first user at reference position 114*a*, for example, and a second set of audio settings can be determined for a second user at reference position 114*a*.

The process of determining audio settings at a reference position can be repeated for each of the reference positions 114*b*-114*c*. The user can select any number of different reference positions and can change and/or update reference positions at any time.

(iv) Storing Mapping Data Mapping the Reference Positions to Audio Settings

Figure 5:
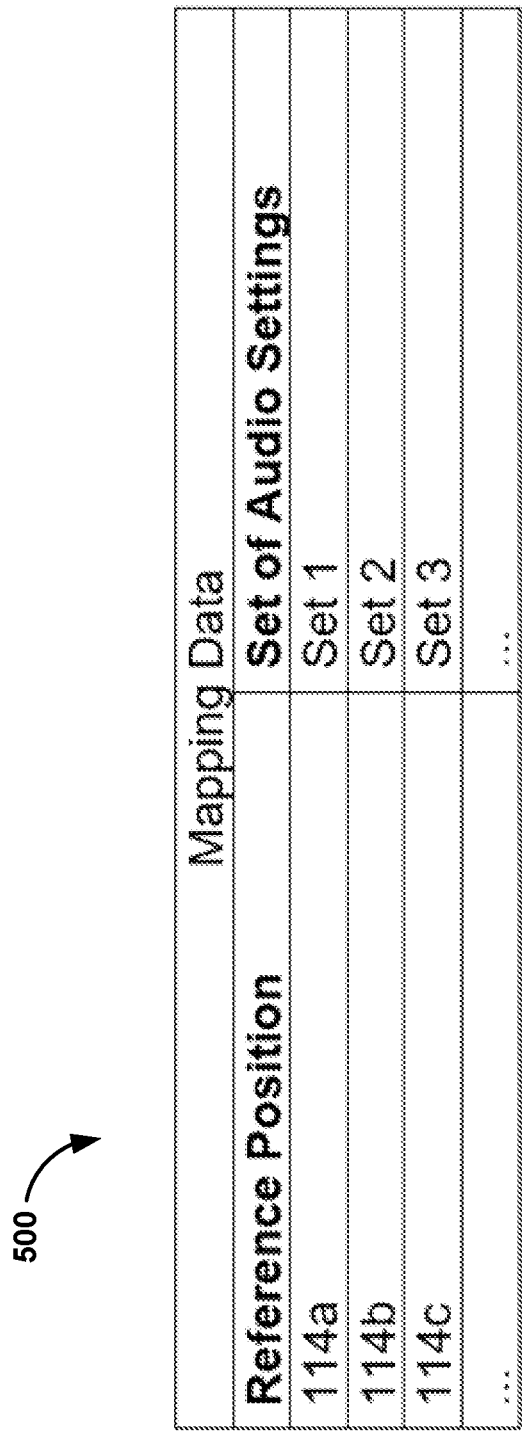
FIG. 5 is a diagram of mapping data that maps reference positions to sets of audio settings.

Once the desired audio settings are determined at each of the reference location, the audio system 100 can store mapping data 500 that specifies a corresponding set of audio settings, for each candidate reference position, as shown in FIG. 5. For instance, reference position 114*a* corresponds to 'SET 1', reference position 114*b* corresponds to 'SET 2', and reference position 114*c* corresponds to 'SET 3'.

2. Detecting a Position of the User with Respect to Reference Positions

Figure 6:
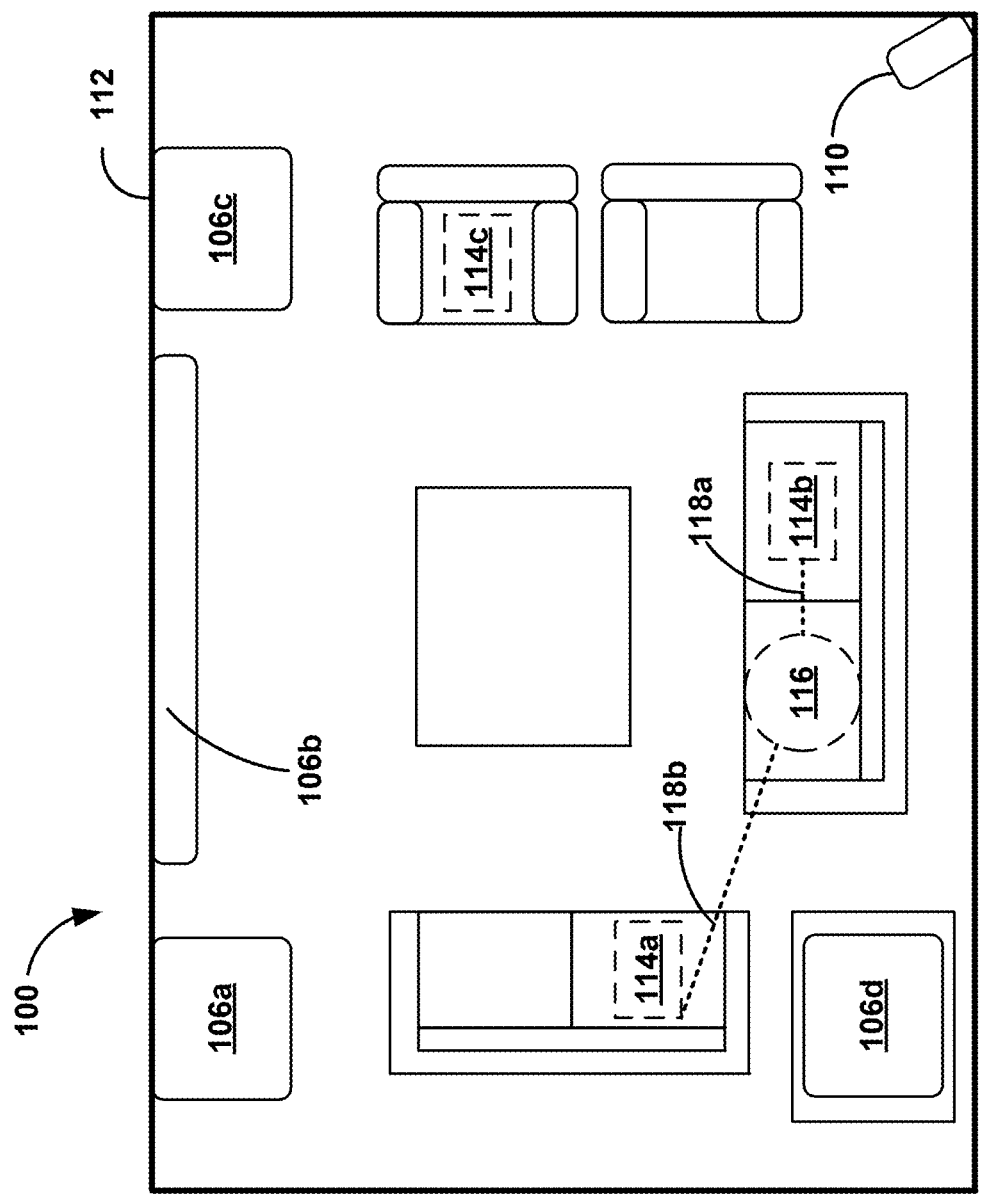
FIG. 6 is a diagram of an example audio system, reference positions and user positions.

After the audio system 100 is calibrated and the mapping data 500 of the reference positions to the audio settings is created and stored, the audio system 100, can determine a user's position 116 within the listening area 112 in preparation for configuring the audio system 100 to output audio, as shown in FIG. 6.

Similar methods can be used to determine the position 116 of the user as described above with reference to the determining the user's position when in the reference positions 114*a*-114*c*. The determined position 116 of the user can include the location of the user (e.g., X, Y, Z coordinates) and/or orientation of the user.

In example implementations, one or more sensors 110 can capture image data of at least a portion of the listening area 112 and the user. The audio system 100 can use the captured image data to distinguish the user from other components of the image (e.g., background of the room) using techniques such as face detection and/or facial pose estimation.

In examples where the sensor 110 includes a camera, once the user is identified within the image, the audio system 100 can use depth estimation techniques, for example, to provide an estimation of the user's position. The audio system 100 can also include sensors such as RADAR, LIDAR, and/or a time of flight sensor to provide an estimation of the user's position.

The audio system 100 can also utilize face detection, or other techniques, to identify an orientation of the user. For instance, the audio system 100 can determine the user's orientation with respect to one or more speakers 106*a*-106*d* and/or with respect to an identified object within the listening area 112.

Additionally or alternatively, one or more microphones 108 can be used to identify the position 116 of the user. For example, the user can speak an audio command. The audio system 100 can determine the respective delay in receiving the audio command at each of the one or more microphones 108.

Additionally or alternatively, one or more of the speakers 102*a*-102*d* and/or one or more of the sensors 110 can use infrared sensors to determine the time of flight to the user to determine the position 116 of the user.

In some examples, detecting a position of user further involves identifying a user profile associated with the user. For example, facial recognition techniques can be used on data captured by sensor 110. In some examples, facial recognition techniques can be used on data collected from sensors such as cameras, RADAR, LIDAR, and/or a time of flight sensors. The audio system 100 can map detected facial features to user profiles. Similarly, one or more microphones 108 can use voice recognition techniques to map a detected voice to a user profile.

In some examples, detecting the position 116 of involves detecting the presence of a user device (e.g., smartphone, smartwatch) within the listening area 112. For instance, the user device may be connected to the same Wi-Fi network as the audio system 100. Further, the audio system 100 can identify a user profile corresponding to the detected user device.

Some example implementations involve detecting a position of more than one user within the listening area 112. For instance, a first user position can be detected and a second user position can be detected.

Once the position of the user is detected within the listening area 112, the audio system 100 can identify a reference position, from the candidate reference positions 114*a*-114*c*, that most closely matches the detected position 116 of the user.

In an example, the audio system 100 can determine that the user's position 116 is closest in proximity to reference position 114*b*. In some examples, the audio system 100 can further determine a difference 118a between the determined user position 116 and the closest reference position 114b. For example, the audio system 100 can determine a difference 118a in location in an X-direction, a Y-direction, and a Z-direction. The audio system 100 can also determine a difference in the orientation of the user position 116 to the orientation of the user at reference position 116.

In another example, the audio system 100 can determine that the user's position 116 is close to both reference position 114a and 114b. The audio system 100 can determine the differences 118a and 118b in position between the detected user position 116 and both reference position 114b and reference position 114a, respectively.

In yet another example, where the audio system 100 can detected more than one user position, the audio system 100 can determine an "average" position 116 between the two user's positions. The audio system 100 can then determine the difference in the location and/or orientation of the average position 116 to the closest reference position 114b.

Alternatively, the audio system 100 can select one user's position (e.g., 116) to determine the closest reference position 114b and/or the difference between the detected user position 116 and the closest reference position 114b. In some examples, this selection can be based on identifying a user profile associated with one or both of the users, in line with the techniques discussed above. Once one or both of the users have been identified, the audio system 100 can select one of the users as the primary user, for example.

3. Using the Detected Position of the User to Select a Set of Audio Settings from the Predefined Audio Settings After the position of the user is detected, the audio system 100 can select the set of audio settings corresponding to the identified closest reference position. In one example, the audio system 100 can do this by accessing and using the mapping data 500, as shown in FIG. 5.

In an example, if the user's position 116 is determined to be closest to reference position 114b, the audio system can select the 'SET 2' from the mapping data 500.

In examples where a user profile is identified in connection with the user, the audio system 100 can select the set of audio settings that corresponds to the closest reference position and the user profile.

In examples where there is a determined difference 118a between the detected user position 116 and the identified reference position 114b, the audio system 100 can determine an adjustment to the corresponding set of audio settings based on the determined difference 118b. For instance, the user position 116 is closer to speaker 106d than at reference position 114b. Thus, the audio system 100 can lower the predetermined volume setting for 106d. Additionally or alternatively, the audio system 100 can adjust the delay setting at one or more speakers 106a-106d based on the determined difference 118a.

The audio system 100 can also adjust the selected set of audio settings based on identified user information (e.g., size, gait) and/or user demographic data (e.g., age). For instance, if the audio system 100 determines that the user is in a certain age demographic based on the user's size, for example, the audio system 100 may adjust the predetermined settings. For example, if the audio system 100 determines that user is a child, the audio system 100 may decrease the predetermined volume and base settings.

The audio system 100 can also adjust the selected set of audio setting based on the number of users identified within the listening area 112. For example, the audio system 100 may increase volume settings when multiple users are detected.

In an example where the detected user position 116 is close to both reference position 114a and reference position 114b, the audio system 100 can select both audio settings in 'SET 1' and 'SET 2' from the mapping data 500. The audio system 100 can use a combination of the settings from 'SET 1' and 'SET 2' to determine an adjusted set of audio settings.

4. Configuring the Audio System

Once the set of audio settings is selected, the audio system 100 can configure the audio system 100 and/or components thereof with the selected set of audio settings. For example, the audio system 100 can configure the speakers 106a-106d with the selected set of audio settings. For example, the audio system 100 can configure the settings to each speaker 106a-106d in the audio system 100. In examples where adjustments are made to the predefined audio settings, the audio system 100 can configure the speakers 106a-106d with the adjusted set of audio settings.

Figure 7:
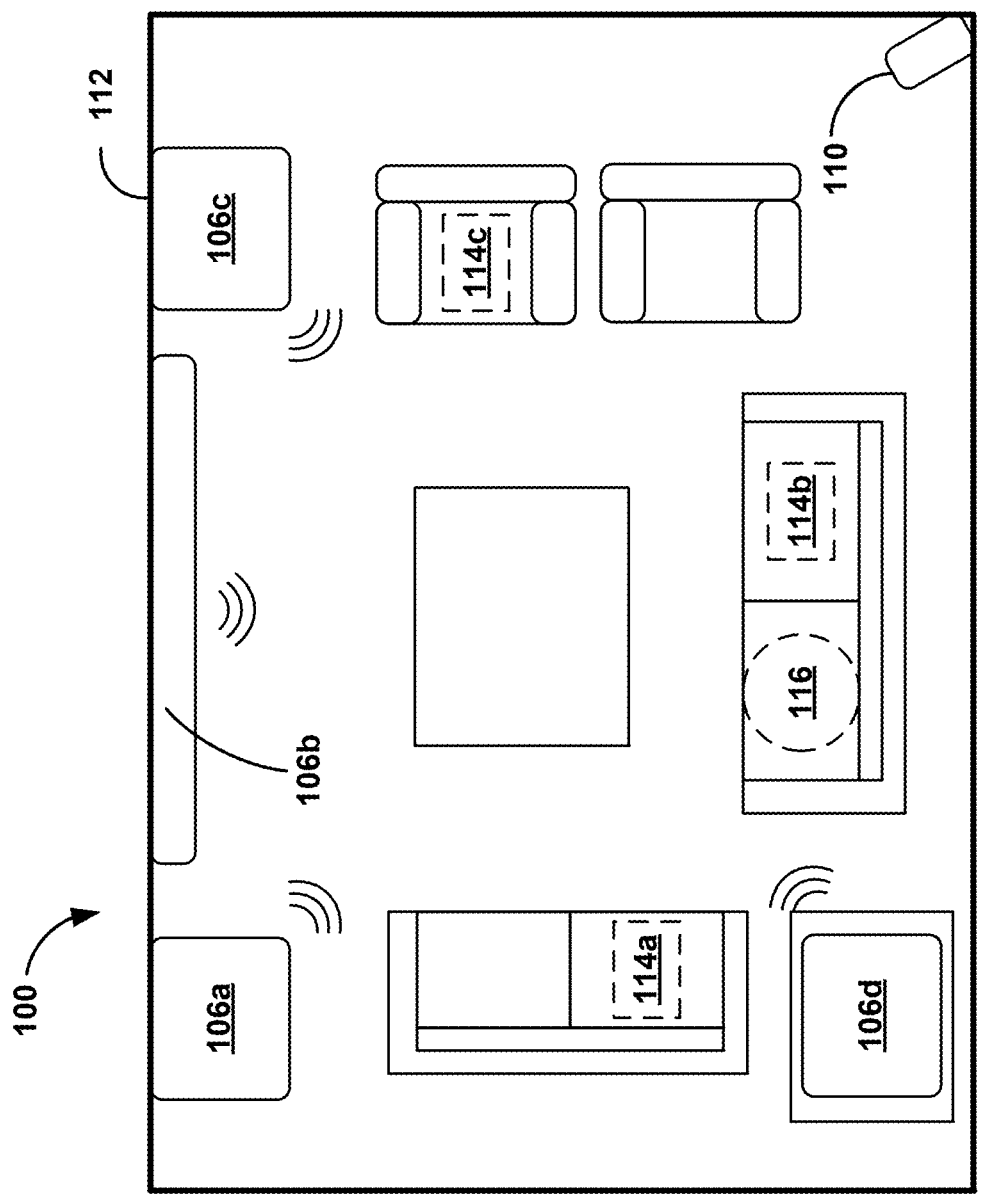
FIG. 7 is a diagram of an example audio system outputting audio.

Once the audio system 100 is configured with the appropriate settings, the audio system 100 can output audio for presentation, as shown in FIG. 7.

In some examples, the audio system 100 can monitor the user's presence within the room to detect that the user has changed positions and/or has left the listening area 112. In some examples, the audio system 100 can determine that the user is in a position for threshold period of time (e.g., 30 seconds) before performing actions to reconfigure the audio system 100.

In some examples, the audio system 100 can stop outputting audio when the user is no longer detected within the listening area 112.

B. Configuring the Audio System based on User Position and Characteristics of Audio System In other examples, the audio system 100 can identify the presence of a user within the listening area 112, determine a set of audio settings based on the identified position of the user, and configure the audio system 100 in accordance with the determined set of audio settings. To do so, the audio system 100 can first perform calibration operations to determine characteristics of the audio system 100 and/or listening area 112. The audio system 100 can then detect a position of the user within the listening area 112. And, the audio system 100 can determine optimal settings based on the user's position with respect to the audio system 100 and/or components of the audio system 100.

1. Calibrating the Audio System

To begin with, the audio system 100 can determine characteristics of the audio system 100 within the listening area 112. In line with the techniques described above, and as shown in FIG. 3, the audio system 100 can determine one or more characteristics about the audio system 100. Characteristics of the audio system 100 can include the number of speakers 106a-106d, the type of speakers 106a-106d, and/or location of each respective speakers 106a-106d, for example. The initial calibration operations can also include determining at size of the listening area 112 and/or a room frequency response.

2. Detecting a Position of the User within the Listening Area

Figure 8:
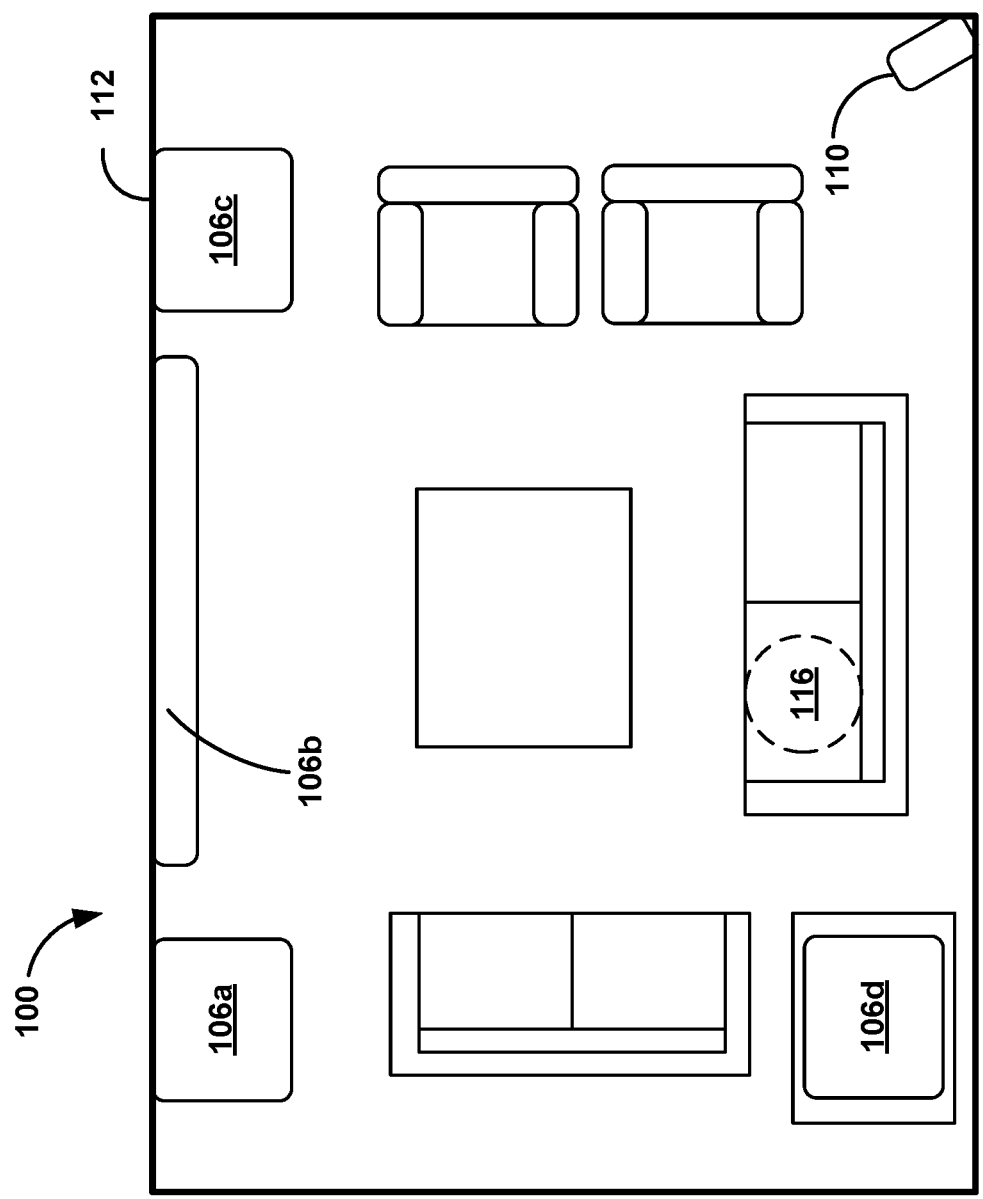
FIG. 8 is an example audio system and user position.

After the audio system 100 has determined one or more characteristics of the audio system 100, the audio system 100 can detect the user position 116 within the listening area 112, as shown in FIG. 8. Similar to techniques described above, the audio system 100 can detect the user's location and/or orientation within the listening area 112.

In example implementations, where the sensor 110 includes one or more cameras within or near the listening area 112 can capture image data of the user and at least a portion of the listening area 112. The audio system 100 can use the captured image data to distinguish the user from other components of the image (e.g., background of the room) using techniques such as face detection, human pose estimation, human body instance segmentation, and/or facial recognition.

In examples where the sensor 110 includes a camera, once the user is identified within the image, the audio system 100 can use depth estimation techniques, as described in more detail above, for example, to provide an estimation of the user's position 116. In examples, the sensor 110 can also capture data to determine additional user information such as gait, size (e.g., height, weight), and/or other information associated with a user. The audio system 100 can also include sensors such as RADAR, LIDAR, and/or a time of flight sensor to provide an estimation of the user's position 116 and/or additional information associated with the user.

The audio system 100 can also use facial recognition, or other techniques, to identify an orientation of the user while at the reference position 116. For instance, the audio system 100 can determine the user's orientation with respect to one or more speaker 106a-106d and/or with respect to an identified object within the listening area 112.

Additionally or alternatively, one or more microphones 108 can be used to identify the user position 116. For example, the user can speak an audio command. The audio system 100 can determine the respective delay in receiving the audio command at the one or more microphones 108 to determine the position of the user.

Additionally or alternatively, the audio system 100 can use RADAR, LIDAR, and/or infrared sensors to determine the time of flight to the user to determine a location of the user.

In some examples, detecting a position 116 of a user position involves detecting the presence of a user device (e.g., smartphone, smartwatch, etc.) within the listening area 112. For instance, the user device may be connected to the same Wi-Fi network as the audio system 100. Additionally, the user device can be associated with a user profile.

In some examples, detecting a position of user further involves identifying a user profile associated with the user. For example, facial recognition techniques can be used on data captured by sensor 110, such as image data captured by a camera or data captured by sensors such as RADAR, LIDAR, and/or time of flight sensors. The audio system 100 can map detected facial features to user profiles. In another example, one or more microphones 108 can use voice recognition techniques to map a detected voice to a user profile. And, as noted above, a user device associated with a user profile can also be detected within the listening area 112.

Some example implementations involve detecting a position of more than one user within the listening area 112. For instance, a first user position can be detected and a second user position can be detected. In these examples, and in line with techniques described above the audio system 100 can determine an "average" position between the two user's positions.

Alternatively, the audio system 100 can select one user's position. In some examples, this selection can be based on identifying a user profile associated with one or both of the users, in line with the techniques discussed above. Once one or both of the users have been identified, the audio system 100 can select one of the users as the primary user, for example.

3. Determine Audio Settings

After one or more characteristics of the audio system 100 are determined and the user position 116 is detected, the audio system 100 can determine audio settings based on the determined characteristics and the detected position. As described above, example audio settings could include a volume setting, a base setting, a surround sound setting, a delay setting, and an equalizer setting.

In examples, the audio system 100 can determine a distance between the detected user position 116 and the position of one or more the speakers 106a-106d. The audio system 100 can then determine audio settings (e.g., delay, volume) based on the determined distance(s). The audio system 100 can then determine appropriate audio settings for each of the speakers 106a-106d. In examples, the audio system 100 can adjust the delay settings for each of the speakers 106a-106d based on the determined distance(s). Similarly, the audio system 100 can determine appropriate volume settings based on the determined distance from the user position 116 to one or more of the speakers 106a-106d. For instance, if the location of the user position 116 is close in proximity to speaker 106d, the audio settings can include a low volume setting at speaker 106d (to avoid the speaker being overly loud with the user being close to it).

In some examples, the audio setting can be determined based on the orientation of the user. For example, at position 116 the settings can indicate front speakers (e.g., 106a-106c) and rear speakers (e.g., 106d) based on the user's orientation.

As described above, in some examples, the set of audio settings can be determined based on the implementation of audio output, the type of speakers 106a-106d, and/or the associated equipment (e.g., receiver 104). For example, the audio delay and/or volume settings may vary based on how audio content is transmitted to the speakers 102a-102h and/or how the speakers 102a-102h are in communication with each other, such as by Enhanced Audio Return Channel (eARC), WI-FI, and/or Bluetooth.

In some examples, the audio settings may include a listening mode, such as surround sound or stereo. For instance, the set of audio settings for the user's position 116 can a include surround sound mode. Alternatively, the audio settings can include a stereo mode.

Additionally or alternatively, audio settings may be determined based on the types of speakers 106a-106d within the audio system 100. For example, in the example shown speakers 106a and 106c may be floor standing speakers. Speaker 106b may be a sound bar speaker. And, speaker 106d may be a portable speaker. The audio system 100 can factor these different types of speakers when determining the audio settings.

In some examples, the audio settings can include only selecting a subset, or group, of speakers 106a-106d within the audio system 100 for outputting audio. This subset or group of speakers can correspond to the speakers closest to the user position 116, for example.

In some examples, the audio settings can be determined based on identified user information (e.g., size, gait) and/or user demographic data (e.g., age). For instance, if the audio system 100 determines that the user is in a certain age demographic based on the user's size, for example, the audio system 100 can determine audio setting based the determined user's age demographic.

In some examples, one or more users can establish a user profile associated with a user. The user profile can include preferences of the user, such as volume setting, base settings, and surround sound settings. For example, a first user may prefer higher base settings than a second user. The audio system 100 can determine audio settings based on these user preferences.

The audio system 100 can also determine audio settings based on the number of users detected within the listening area 112. For example, when more than one user is detected within the listening area 112, the volume settings may be higher.

4. Configuring the Audio System

Once the audio settings are determined based at least on the detected user's position, the audio system 100 can configure the audio system 100 and/or components thereof with the selected set of audio settings. For example, the audio system 100 can configure the speakers 106a-106d with the determined audio settings. For instance, the audio system 100 can apply the appropriate settings to each speaker 102a-102d in the audio system 100.

Once the audio system 100 is configured with the appropriate settings, the audio system 100 can output audio for presentation, as shown in FIG. 7. I

C. Example Method

Figure 9:
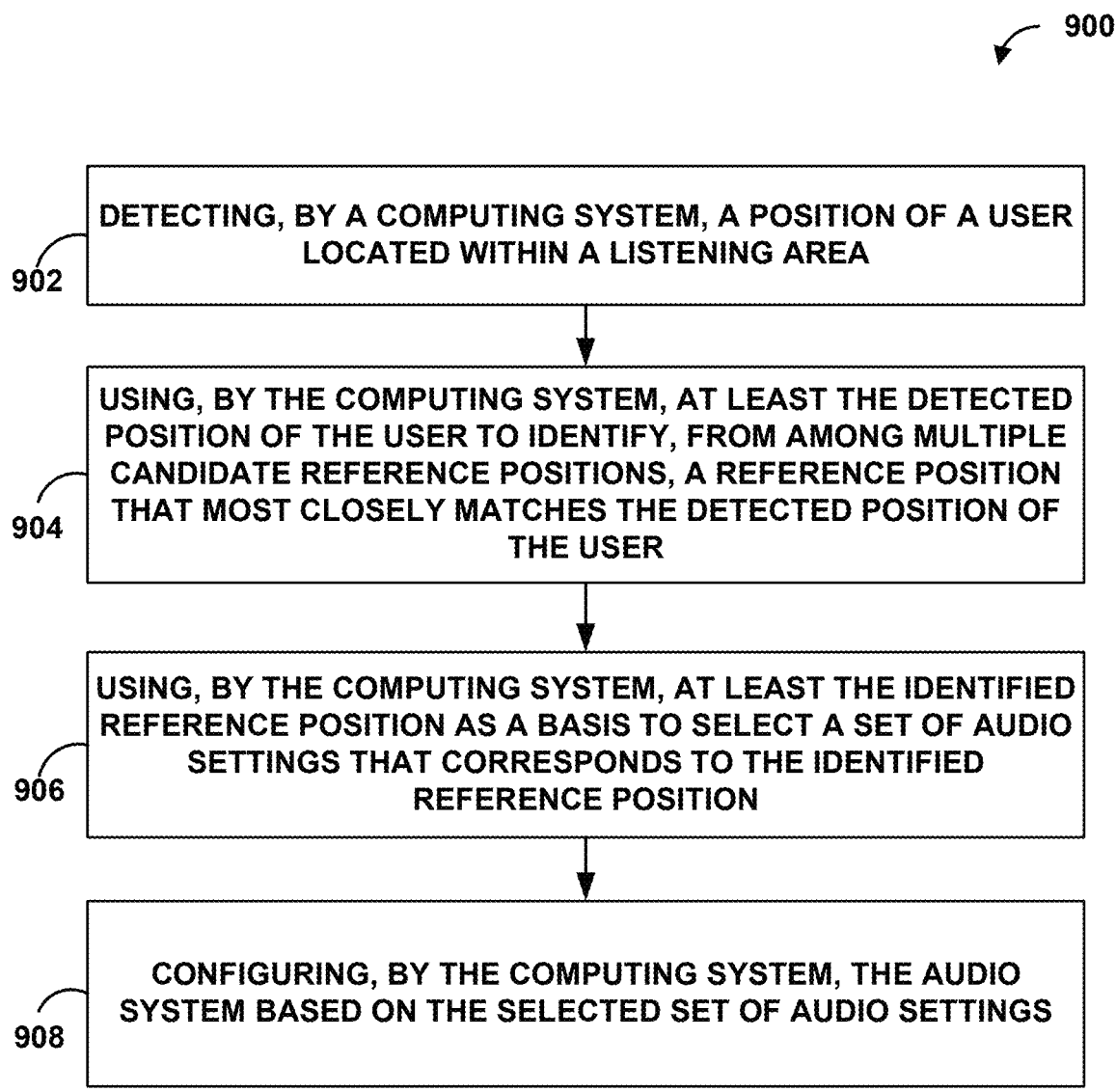
FIG. 9 is a flow chart of an example method.

FIG. 9 is a flow chart illustrating an example method 900. The method 900 can be carried out by an audio system, such as the audio system 100, or more generally, by a computing system. At block 902, the method 900 includes detecting, by a computing system, a position of a user located within the listening area. At block 904, the method 900 includes using, by the computing system, at least the detected position of the user to identify, from among multiple candidate reference positions, a reference position that most closely matches the detected position of the user. At block 906, the method 900 includes using, by the computing system, at least the identified reference position as a basis to select a set of audio settings that corresponds to the identified reference position. And at block 908, the method 900 includes configuring, by the computing system, the audio system based on the selected set of audio settings.

Figure 10:
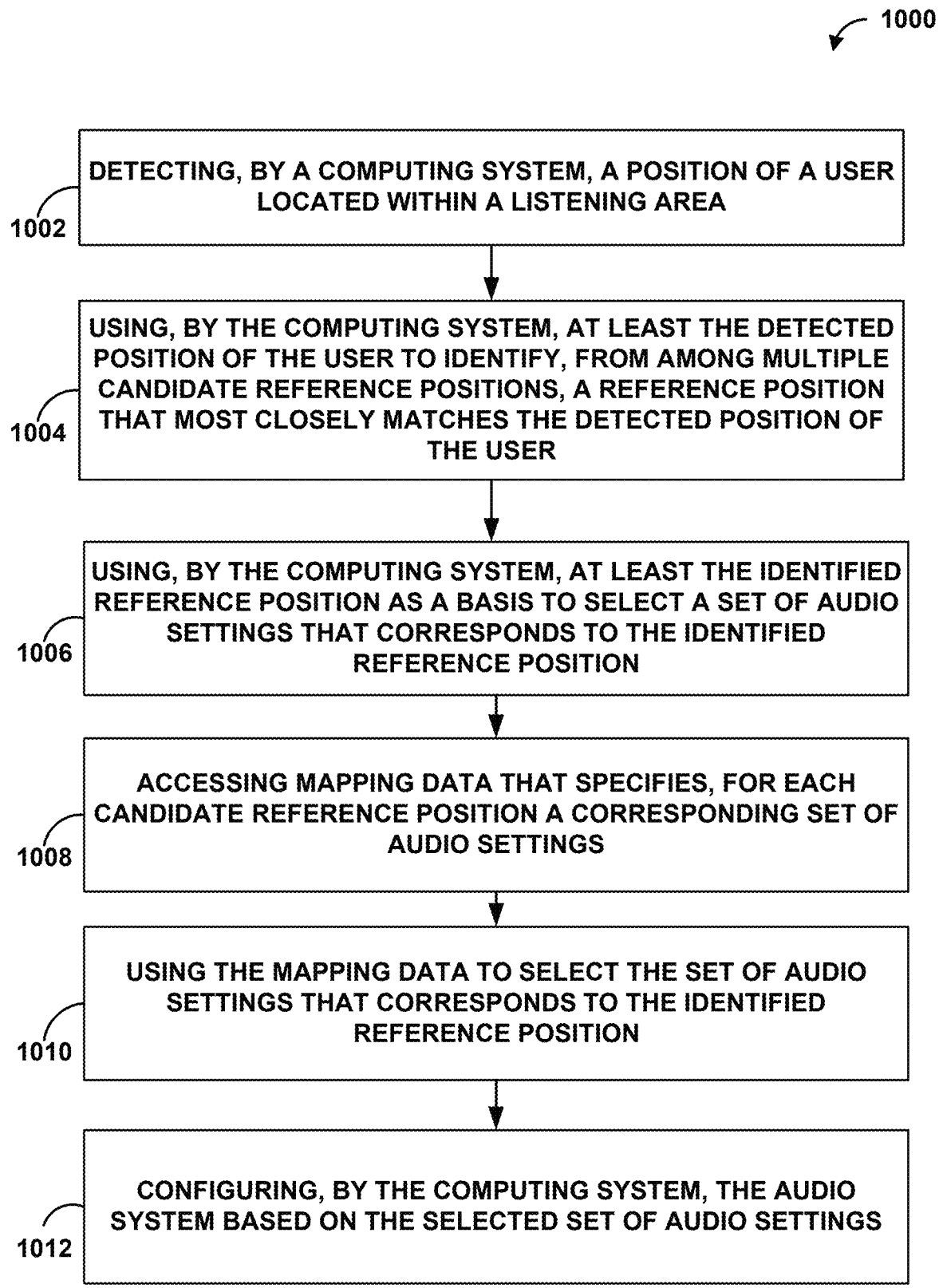
FIG. 10 is a flow chart of an example method.

FIG. 10 is a flow chart illustrating an example method 1000. The method 1000 can be carried out by an audio system, such as the audio system 100, or more generally, by a computing system. At block 1002, the method 1000 includes detecting, by a computing system, a position of a user located within the listening area. At block 1004, the method 1000 includes using, by the computing system, at least the detected position of the user to identify, from among multiple candidate reference positions, a reference position that most closely matches the detected position of the user. At block 1006, the method 1000 includes using, by the computing system, at least the identified reference position as a basis to select a set of audio settings that corresponds to the identified reference position. At block 1008, the method 1000 includes accessing mapping data that specifies, for each candidate reference position a corresponding set of audio settings. At block 1010, the method 1000 includes using the mapping data to select the set of audio settings that corresponds to the identified reference position. And at block 1012, the method 1000 includes configuring, by the computing system, the audio system based on the selected set of audio settings.

Figure 11:
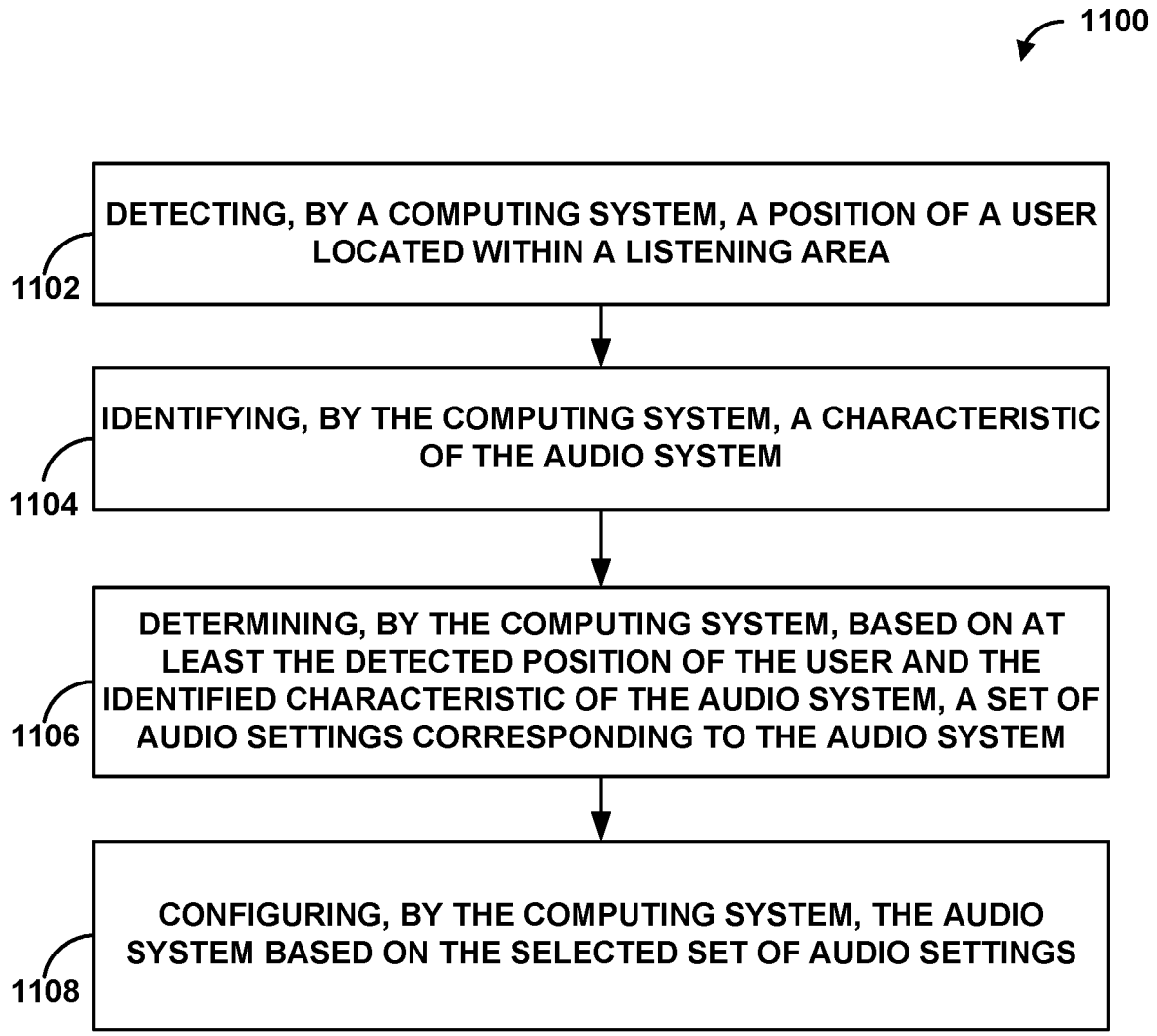
FIG. 11 is a flow chart of an example method.

FIG. 11 is a flow chart illustrating an example method 1100. The method 1100 can be carried out by an audio system, such as the audio system 100, or more generally, by a computing system. At block 1102, the method 1100 includes detecting, by a computing system, a position of a user located within the listening area. At block 1104, the method 1100 includes identifying, by the computing system, a characteristic of the audio system. At block 1106, the method 1100 includes determining, by the computing system, based on at least the detected position of the user and the identified characteristic of the audio system, a set of audio settings corresponding to the audio system. And at block 1108, the method 1100 includes configuring, by the computing system, the audio system based on the selected set of audio settings.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with an audio system that is configured to present audio within a listening area, the method comprising:
    detecting, by a computing system, a position of a user located within the listening area;
    using, by the computing system, at least the detected position of the user to identify, from among multiple candidate reference position, a reference positions that most closely matches the detected position of the user, and wherein using at least the detected position of the user to identify, from among multiple candidate reference positions, the reference position that most closely matches the detected position of the user comprises:
        for each of the multiple candidate reference positions, calculating a distance between that candidate reference position and the detected position of the user, and
        identifying the reference position with the shortest calculated distance to be the reference position that most closely matches the detected position of the user;
    using, by the computing system, at least the identified reference position as a basis to select a set of audio settings that corresponds to the identified reference position; and
    configuring, by the computing system, the audio system based on the selected set of audio settings.

2. The method of claim 1, wherein the audio system includes multiple speakers and a speaker controller, which is connected to each of the multiple speakers.

3. The method of claim 1, wherein detecting the position of the user located within the listening area comprises:

capturing, using a camera of the computing system, image data of at least a portion of the listening area; and using the captured image data to detect the position of the user.

4. The method of claim 1, wherein the position of the user is a location of the user within the listening area.

5. The method of claim 1, wherein the position of the user is an orientation of the user.

6. The method of claim 1, wherein using at least the identified reference position as a basis to select the set of audio settings that corresponds to the identified reference position comprises:

accessing mapping data that specifies, for each candidate reference position a corresponding set of audio settings; and using the mapping data to select the set of audio settings that corresponds to the identified reference position.

7. The method of claim 6, wherein the mapping data was generated by the computing system in connection with operation in a calibration mode.

8. The method of claim 1, wherein the selected set of audio settings includes an audio setting selected from the group consisting of a volume setting, a base setting, a surround sound setting, a delay setting, and an equalizer setting.

9. The method of claim 1, wherein configuring the audio system based on the selected set of audio settings comprises configuring the audio system in accordance with the selected set of audio settings.

10. The method of claim 1, further comprising:

determining a difference between the detected position of the user and the detected reference position that most closely matches the detected position of the user; and adjusting the selected set of audio settings based on the determined difference between the detected position of the user and the detected reference position that most closely matches the detected position of the user, and wherein configuring the audio system based on the selected set of audio settings comprises configuring the audio system in accordance with the adjusted selected set audio settings.

11. The method of claim 1, further comprising:

the configured audio system outputting for presentation, audio content.

12. The method of claim 1, further comprising:

identifying a user profile associated with the user, and wherein using at least the identified reference position as a basis to select a set of audio settings that corresponds to the identified reference position comprises using at least the identified reference position and the identified user profile as a basis to select a set of audio settings that corresponds to the identified reference position for that user profile.

13. The method of claim 1, wherein detecting the position of the user located within the listening area comprises detecting multiple positions each corresponding to respective one of multiple users located within the listening area, and wherein using at least the detected position of the user to identify, from among multiple candidate reference positions, a reference position that most closely matches the detected position of the user comprises using at least the detected positions of the multiple users to identify, from among multiple candidate reference positions, a reference position that most closely matches the detected positions of the multiple users.

14. A computing system configured for performing a set of acts in connection with an audio system that is configured to present audio within a listening area, the set of acts comprising:

detecting a position of a user located within the listening area;

using at least the detected position of the user to identify, from among multiple candidate reference positions, a reference position that most closely matches the detected position of the user, and wherein using at least the detected position of the user to identify, from among multiple candidate reference positions, the reference position that most closely matches the detected position of the user comprises:

for each of the multiple candidate reference positions, calculating a distance between that candidate reference position and the detected position of the user, and identifying the reference position with the shortest calculated distance to be the reference position that most closely matches the detected position of the user;

using at least the identified reference position as a basis to select a set of audio settings that corresponds to the identified reference position; and configuring the audio system based on the selected set of audio settings.

15. The computing system of claim 14, wherein the audio system includes multiple speakers and a speaker controller, which is connected to each of the multiple speakers.

16. The computing system of claim 14, wherein detecting the position of the user located within the listening area comprises:

capturing, using a camera of the computing system, image data of at least a portion of the listening area; and using the captured image data to detect the position of the user.

17. The computing system of claim 14, wherein using at least the identified reference position as a basis to select the set of audio settings that corresponds to the identified reference position comprises:

accessing mapping data that specifies, for each candidate reference position a corresponding set of audio settings; and using the mapping data to select the set of audio settings that corresponds to the identified reference position.

18. A non-transitory computer-readable medium having stored thereon program instructions that upon execution by a computing system, cause performance of a set of acts in connection with an audio system that is configured to present audio within a listening area, the set of acts comprising:

detecting a position of a user located within the listening area;

using at least the detected position of the user to identify, from among multiple candidate reference positions, a reference position that most closely matches the detected position of the user, and wherein using at least the detected position of the user to identify, from among multiple candidate reference positions, the reference position that most closely matches the detected position of the user comprises:

for each of the multiple candidate reference positions, calculating a distance between that candidate reference position and the detected position of the user, and identifying the reference position with the shortest calculated distance to be the reference position that most closely matches the detected position of the user;

using at least the identified reference position as a basis to select a set of audio settings that corresponds to the identified reference position; and configuring the audio system based on the selected set of audio settings.

* * * * *